(12) United States Patent
Hall et al.

(10) Patent No.: US 7,948,239 B1
(45) Date of Patent: May 24, 2011

(54) METHOD FOR CONTROLLING A DEPTH OF AN INDUCTION FIELD

(76) Inventors: David R. Hall, Provo, UT (US); Harold L. Snyder, Jr., Rockwall, TX (US); Paula Turner, Pleasant Grove, UT (US); Clint Cook, Provo, UT (US)

( * ) Notice: Subject to any disclaimer, the term of this patent is extended or adjusted under 35 U.S.C. 154(b) by 0 days.

(21) Appl. No.: 12/842,335

(22) Filed: Jul. 23, 2010

Related U.S. Application Data (63) Continuation of application No. 12/727,896, filed on Mar. 19, 2010.

(51) Int. Cl.
*G01V 3/28* (2006.01)
(52) U.S. Cl. ........................................................ 324/339
(58) Field of Classification Search ................. 324/339
See application file for complete search history.

(56) References Cited

U.S. PATENT DOCUMENTS

| | | |
|---|---|---|
| 4,785,247 A | 11/1988 | Meador |
| 4,933,640 A | 6/1990 | Kuckes |
| 4,980,643 A | 12/1990 | Gianzero |
| 5,045,795 A | 9/1991 | Gianzero |
| 5,081,419 A | 1/1992 | Meador |
| 5,089,779 A | 2/1992 | Rorden |
| 5,095,272 A | 3/1992 | Sinclair |
| 5,428,293 A | 6/1995 | Sinclair |
| 5,442,294 A | 8/1995 | Rorden |
| 5,448,227 A | 9/1995 | Orban |
| 5,594,343 A | 1/1997 | Clark |
| 5,606,260 A | 2/1997 | Giordano |
| 6,068,394 A | 5/2000 | Dublin, Jr. |
| 6,100,696 A | 8/2000 | Sinclair |
| 6,163,155 A | 12/2000 | Bittar |
| 6,191,586 B1 | 2/2001 | Bittar |
| 6,218,842 B1 | 4/2001 | Bittar |
| 6,359,438 B1 | 3/2002 | Bittar |
| 6,476,609 B1 | 11/2002 | Bittar |
| 6,538,447 B2 | 3/2003 | Bittar |
| 6,577,129 B1 | 6/2003 | Thompson |
| 6,586,939 B1 | 7/2003 | Fanini |
| 6,667,620 B2 | 12/2003 | Homan |
| 6,677,756 B2 | 1/2004 | Fanini |
| 6,680,613 B2 | 1/2004 | Rosthal |
| 6,768,407 B2 | 7/2004 | Kohda |
| 7,026,820 B2 * | 4/2006 | Xiao et al. ..................... 324/339 |
| 7,038,457 B2 * | 5/2006 | Chen et al. ..................... 324/339 |
| 7,046,009 B2 | 5/2006 | Itskovich |
| 7,098,657 B2 | 8/2006 | Guilhamat et al. |
| 7,098,858 B2 | 8/2006 | Bittar |
| 7,138,897 B2 | 11/2006 | Minerbo |
| 7,141,981 B2 | 11/2006 | Folberth |
| 7,150,316 B2 | 12/2006 | Itskovich |
| 7,193,420 B2 | 3/2007 | Chen |
| 7,212,132 B2 | 5/2007 | Goa |
| 7,598,742 B2 * | 10/2009 | Synder et al. ................. 324/339 |
| 2004/0104794 A1 | 6/2004 | Kohda |
| 2010/0052689 A1 * | 3/2010 | Hall et al. ..................... 324/339 |

* cited by examiner

*Primary Examiner* — Reena Aurora
(74) *Attorney, Agent, or Firm* — Tyson J. Wilde; Philip W. Townsend, III (57) ABSTRACT

In one aspect of the present invention, an induction resistivity tool includes an induction transmitter and an induction receiver located along the length of the tool. The transmitter is located adjacent at least one induction bucking coils of the tool. When activated the bucking coils are configured to direct a field transmitted by the induction transmitter away from the tool at an angle from the central axis of the tool.

10 Claims, 14 Drawing Sheets

METHOD FOR CONTROLLING A DEPTH OF AN INDUCTION FIELD

CROSS REFERENCE TO RELATED APPLICATIONS

This application is a continuation of U.S. patent application Ser. No. 12/727,896 filed Mar. 19, 2010; which is herein incorporated by reference for all that it contains.

BACKGROUND OF THE INVENTION

Electric resistivity of a downhole formation is often measured from a wireline or drill string component in a well bore to analyze formation parameters. Induction resistivity tools induce a magnetic field into the formation; and thus, are different from electrode resistivity systems, where an electric current is passed through the formation.

U.S. Pat. No. 6,677,756 to Fanini, et al, which is herein incorporated by reference for all that it contains, discloses an induction tool for formation resistivity evaluations. The tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in an LWD system that includes a transmitter array with multiple transmitters positioned above a pair of receivers. The transmitters are selectively energized, causing current to be induced in the collar of the tool.

U.S. Pat. No. 6,577,129 to Thompson, et al, which is herein incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is herein incorporated by reference for all that it contains, discloses a multi-mode resistivity tool for use in a logging-while-drilling system that includes an asymmetric transmitter design with multiple transmitters capable of generating electromagnetic signals at multiple depths of investigation.

U.S. Pat. No. 7,141,981 to Folbert, et al, which is herein incorporated by reference for all that it contains, discloses a resistivity logging tool suitable for downhole use that includes a transmitter, and two spaced apart receivers. The measured resistivities at the two receivers are corrected based on measuring the responses of the receivers to a calibration signal.

U.S. Pat. No. 6,218,842 to Bittar, et al, which is herein incorporated by reference for all that it contains, discloses a resistivity tool for use in LWD systems that includes an asymmetric transmitter design with multiple transmitters capable of generating EM signals at multiple frequencies.

U.S. Pat. No. 5,045,795 to Gianzero, et al, which is herein incorporated by reference for all that it contains, discloses a coil array which is installed on a drill collar for use in a resistivity logging system. The drill collar is provided with upper and lower coil support rings. These are toroids which support individual coil segments, and are connected by suitable magnetic shorting bars. The coil segments and shorting bars inscribe a specified solid angle or azimuthal extent.

U.S. Pat. No. 5,606,260 to Giordano, et al, which is herein incorporated by reference for all that it contains, discloses a microdevice which is provided for measuring the electromagnetic characteristics of a medium in a borehole. The microdevice includes at least one emitting or transmitting coil, and at least one receiving coil. The microdevice generates an A.C. voltage at the terminals of the transmitting coil and measures a signal at the terminals of the receiving coil. The microdevice also includes an E-shaped electrically insulating, soft magnetic material circuit serving as a support for each of the coils and which is positioned adjacent to the medium in the borehole.

U.S. Pat. No. 6,100,696 to Sinclair, which is herein incorporated by reference for all that it contains, discloses a directional induction logging tool is provided for measurement while drilling. This tool is preferably placed in a side pocket of a drill collar, and it comprises transmitter and receiver coils and an electromagnetic reflector.

U.S. Pat. No. 6,163,155 to Bittar, et al, which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar, et al, which is herein incorporated by reference for all that it contains, discloses an antenna configuration in which a transmitter antenna and a receiver antenna are oriented in non-parallel planes such that the vertical resistivity and the relative dip angle are decoupled.

BRIEF SUMMARY OF THE INVENTION

In one aspect of the invention, an induction resistivity tool includes at least one induction transmitter and at least one induction receiver placed along the length of the tool. The transmitter is located between at least one induction bucking coil of the tool, such that when activated the bucking coils are configured to direct the field produced by the induction transmitter at any angle from the central longitudinal axis of the tool.

In some embodiments, the bucking coils on either side of the transmitter may be in electrical communication with separate power sources and at least one of the bucking coils may be in communication with a central processing unit.

The bucking coils may also be disposed at different distances and heights from the transmitter. One bucking coil may have significantly more wire turns then the other. The transmitter or at least one bucking coil may be positioned at an angle with respect to the central longitudinal axis.

In one embodiment, the transmitter may comprise at least one coil wrapped around the circumference of the tool or a plurality of units spaced along the circumference of the tool. These units may be electrically isolated from one another.

Additional bucking coils may be positioned at a distance from the transmitter greater than the distance of the other bucking coils adjacent to the transmitter.

The induction field may approach, overlap, or extend beyond the longitudinal axial position of the bottom of the tool or a drill bit that may be secured to the tool. The tool may also be part of a downhole tool string or a wireline assembly.

In another aspect of the invention, a method for taking an induction resistivity measurement includes the steps of having an induction transmitter and an induction receiver disposed along the length of the resistivity tool and projecting an induction field from the transmitter at an angle less than 90 degrees from the central axis of the tool. The induction field may be projected by activating induction bucking coils on either side of the transmitter. One bucking coil may be energized more than the other or the current through the bucking coil may be individually adjusted. By adjusting the current through the bucking coils, the induction field may sweep over any angle away from the tool.

Another method for taking an induction resistivity measurement includes the steps: having an induction transmitter and an induction receiver disposed along a length of the tool, the transmitter being disposed between the at least one induction bucking coil of the tool, projecting an induction field from the transmitter outward toward the formation, and controlling at least one characteristic of the induction field with at least one of the bucking coils. The characteristics of the induction field include: projected angle, shape, and length. These characteristics may be controlled by changing the current through all of the bucking coils at the same rate, changing the current through at least one bucking coils, changing the current through at least one of the bucking coils inversely, and changing the distance from the transmitter to at least one bucking coil. The projected angle of the induction field may change to such a degree that a portion of the field projects passed the end of the down-hole tool string.

The tool may be part of a down-hole tool string or part of a wireline assembly.

One or more bucking coil may have significantly more wire turns than the other. The bucking coils may be spaced apart from the transmitter along the length of the tool and electrically isolated from one another. The transmitter may comprise a plurality of units spaced along the circumference of the tool that may be individually energized.

The position or angle of at least one of the bucking coils may be changed during an operation.

Each of the transmitter, bucking, and receiver coils may utilize a ferromagnetic material between the coils and the metal tool or between the coils and other coils to direct the field for the purpose of controlling the characteristics of the field and minimizing the effect of the tool.

DETAILED DESCRIPTION OF THE INVENTION AND THE PREFERRED EMBODIMENT

Figure 1:
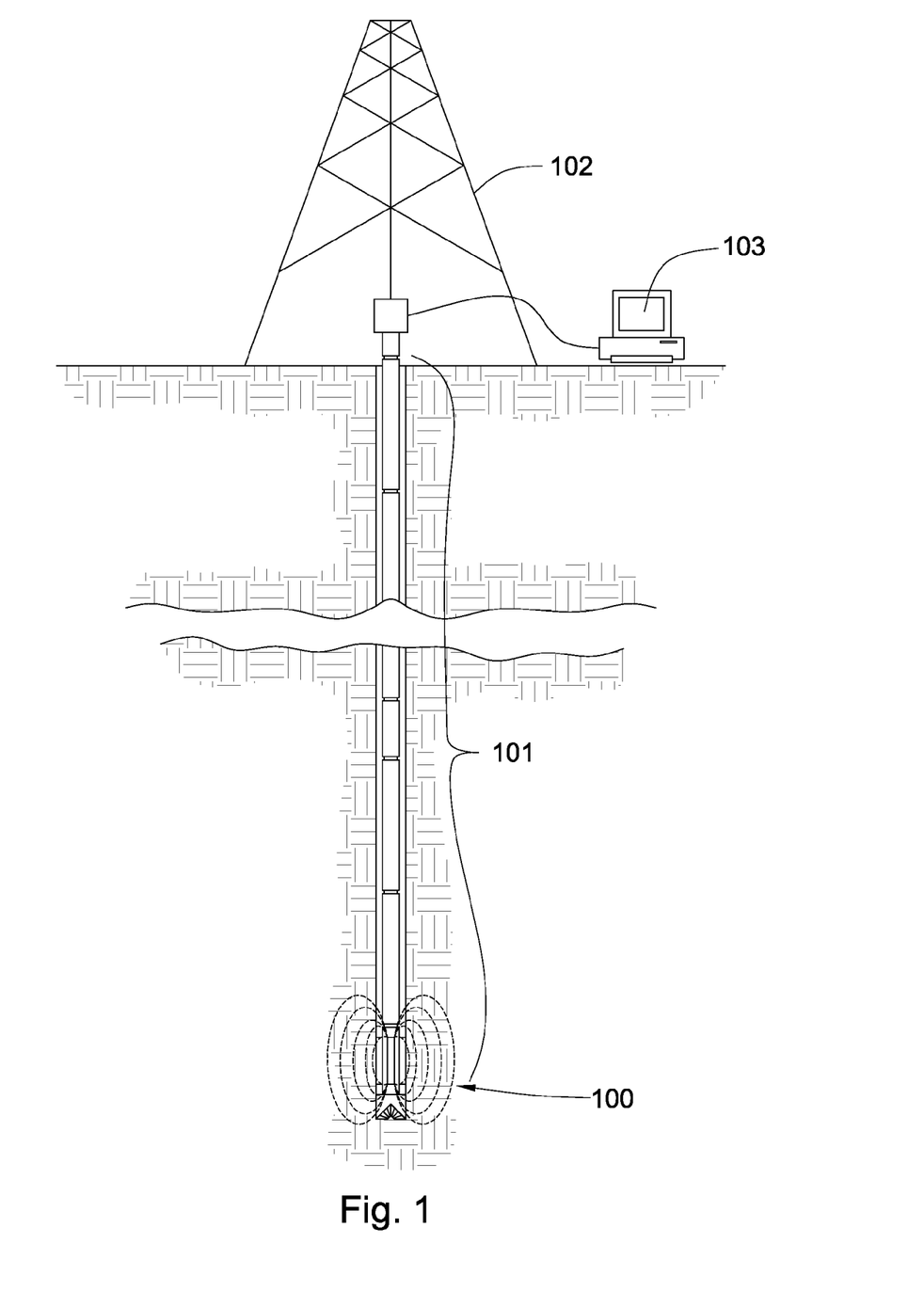
FIG. 1 is a perspective diagram of an embodiment of a down-hole tool string suspended in a bore-hole.

Referring now to FIG. 1, a down-hole tool string 101 may be suspended by a derrick 102. The tool string may comprise one or more tool string components 100, linked together in a tool string 101 and in communication with surface equipment 103 through a down-hole network. A network in the tool string 101 may enable high-speed communication between devices connected to the tool string, and the network may facilitate the transmission of data between sensors and sources. The data gathered by the down-hole components 100 may be processed down-hole, may be transmitted to the surface for processing, may be filtered down-hole and then transmitted to the surface for processing, may be compressed down-hole and then transmitted to the surface for processing, or in part or whole stored in the tool.

Figure 2:
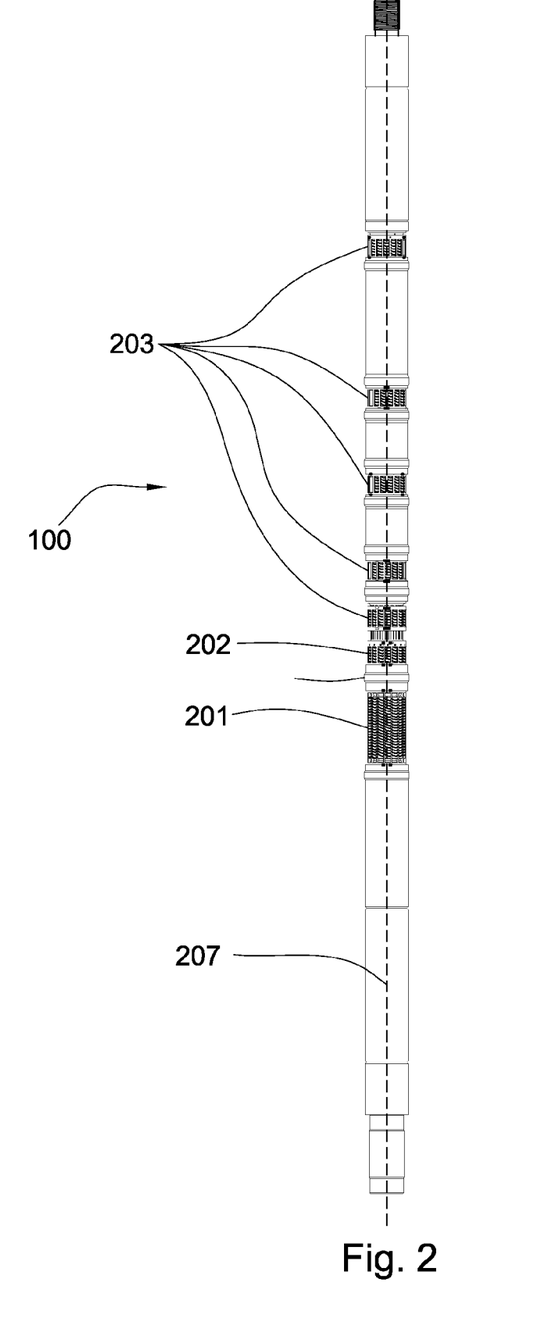
FIG. 2 is a perspective diagram of an embodiment of a tool string component.

FIG. 2 is an embodiment of a tool string component 100. The tool string component may comprise an induction transmitter 201 and a plurality of induction receivers 202, 203 spaced along a central axis 207 of the component 100. The receivers 202, 203 may be placed in a variety of orientations with respect to each other and to the transmitter 201. The induction transmitter 201 is adapted to send an induction signal in to the formation, which generates a formation induction field surrounding the well bore. The induction receivers 202, 203 are adapted to sense various attributes of the induction field in the formation. These attributes may include among others, some or all of the following: frequency, amplitude, phase, or waveshape. The transmitter and the receivers may be powered by batteries, a turbine generator or from the down-hole network. The receivers may be passive or active in any combination. In some embodiments there may be several induction transmitters 201 located along the length of the tool string component 100. In some embodiments, at least one transmitter and at least one receiver may be used for measurements and calibration.

Figure 3:
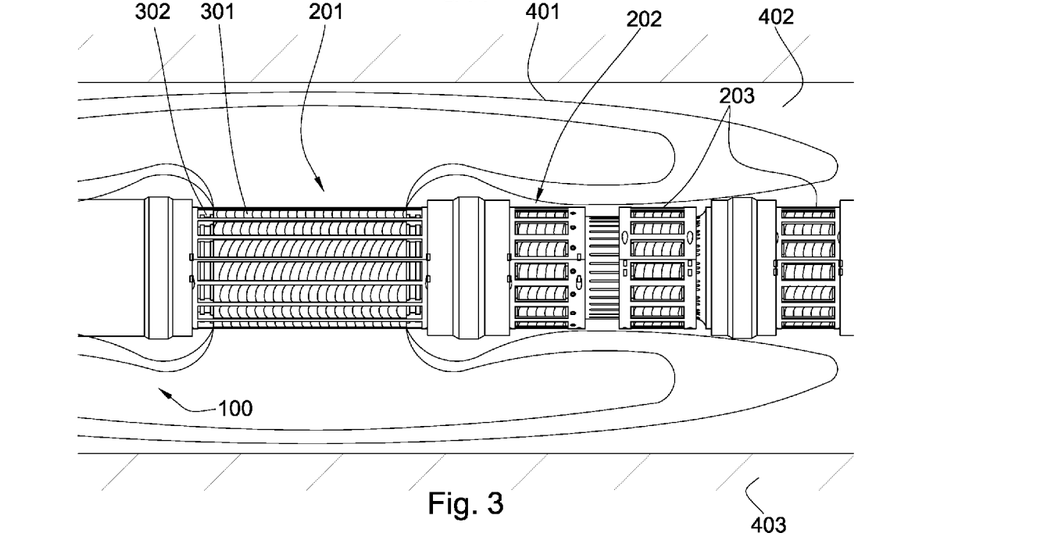
FIG. 3 is a perspective diagram of an embodiment of an induction resistivity assembly.
Figure 4:
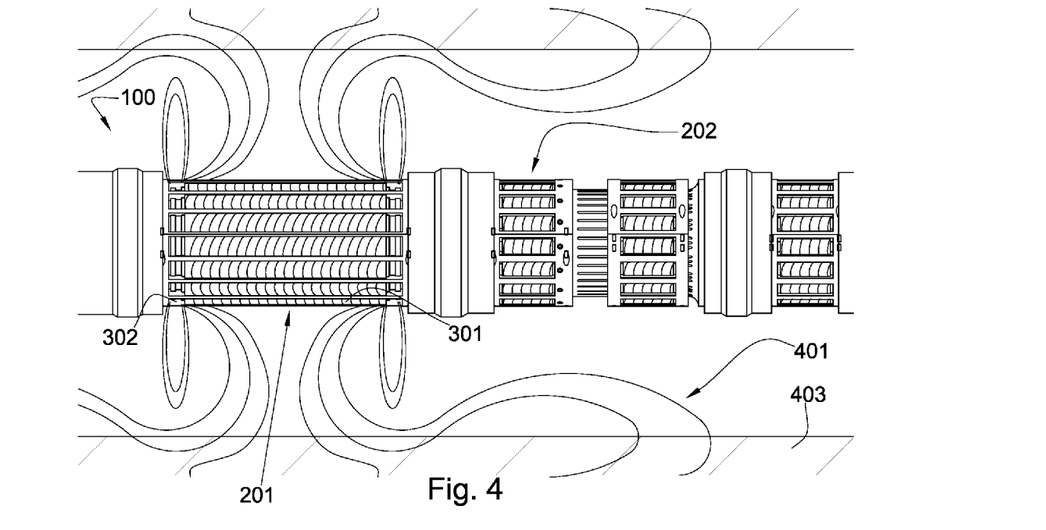
FIG. 4 is a perspective diagram of another embodiment of an induction resistivity assembly.

Referring now to FIGS. 3 and 4, an embodiment of a tool string component is depicted in a borehole. The drill string component comprises a transmitter 201, and receivers 202 and 203. At least one of the receivers 202 and 203 may be also used to calibrate the tool or measure the transmitted field. The transmitter unit 301 is depicted generating an induction signal 401 with the bucking coils 302 being inactive. Drilling mud 402 is disposed between the tool string component and the formation 403. The magnetic field 401 may tend to predominately travel within the bore hole or within a shallow portion of the formation infiltrated by drilling mud and may not penetrate deeply into the formation 403. This may prevent an accurate measurement or assessment of the formation surrounding the bore hole.

FIG. 4 depicts an embodiment of a tool string component with both the transmitter unit 301 and the bucking coils 302 activated which shows the induction signal traveling deeper in the formation. By adjusting the output of the bucking coils 302, the penetration depth and angle of the induction signal 401 may be adjusted.

The transmitter 201 may comprise an array of transmitter units 301 spaced circumferentially around the tool string 100. The transmitter units 301 may be independently excitable. Independently excitable units may focus the induction field in only a portion of the formation adjacent to the excitable units while the remaining portion of the formation is minimally affected or not affected at all. Furthermore it is believed that the ability to concentrate the field in portions of the formation adjacent the well bore will allow for directional measurements of the formation. Data received through directional measurement may verify a current drilling trajectory or it may reveal needed adjustments. Drilling trajectory may be manually adjusted or automatically controlled through the tool.

The transmitter 201 may also comprise one or more bucking coil 302, which may guide the induction field produced by at least one transmitter units 301 by forcing the transmitter's signal deeper or at any angle into the formation. The windings on the transmitter 201 may be in a different direction than the windings in one or more the bucking coil 302. In some embodiments, the bucking coil 302 may generate an augmented induction field or a directed induction field. Examples of transmitter coils that may be used include Halbach arrays and/or electromagnetic coils. Examples of bucking coils that may be used to influence the signal from the transmitter include Halbach arrays, electromagnetic coils. Without the bucking coil 302 the transmitter's signal may travel along the path of least resistance which could be within a shallower region of the formation or even along the surface of or into the tool string component. The bucking coil 302 may generate a directed induction field that will repel the signal away from the tool string component, and thus, deeper into the formation. One or more bucking coil 302 may have a startup or periodic calibration sequence such that when one or more of the transmitter 201 energizes, one or more of the receivers 202 and 203 measures the field strength which allows the tool to adjust the output of the transmitter 201 and one or more bucking coil 302 until the field measured by at least one of the receivers 202 and 203 is at a desired depth or angle. The bucking coils 302 and 303 may also have units that are independently excitable with respect to phase, one or more frequencies, magnitude, and wave shape.

Figure 5A:
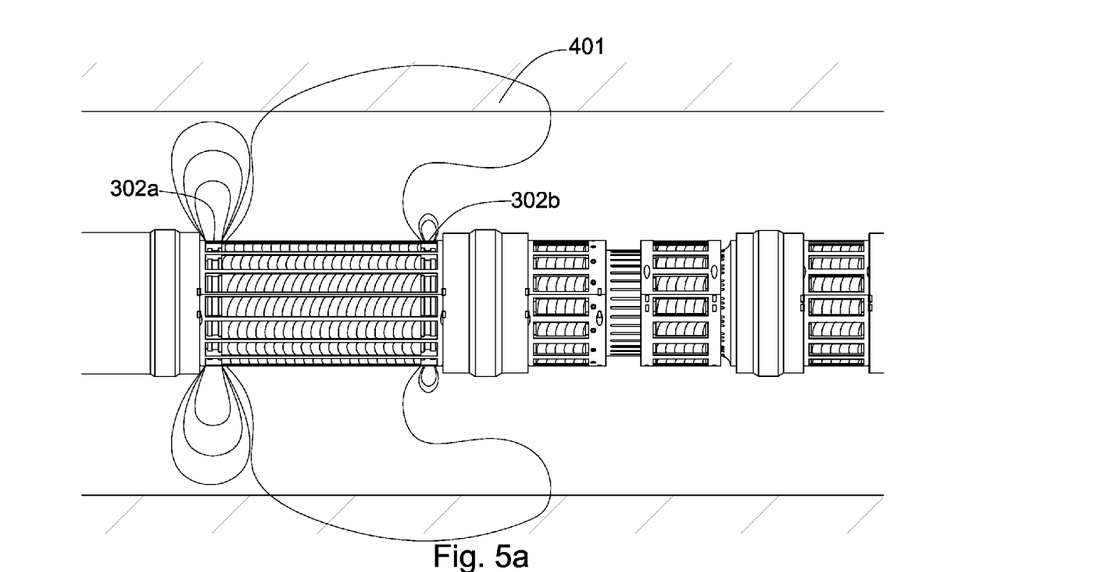
FIG. 5a is a perspective diagram of another embodiment of an induction resistivity assembly.

FIG. 5a depicts another embodiment of a tool string component with the transmitter 201 activated. Bucking coil 302a is shown emitting significantly more power than bucking coil 302b, which may cause the magnetic field 401 to be projected at an angle other than 90 degrees from the tool joint longitudinal axis 207.

Figure 5B:
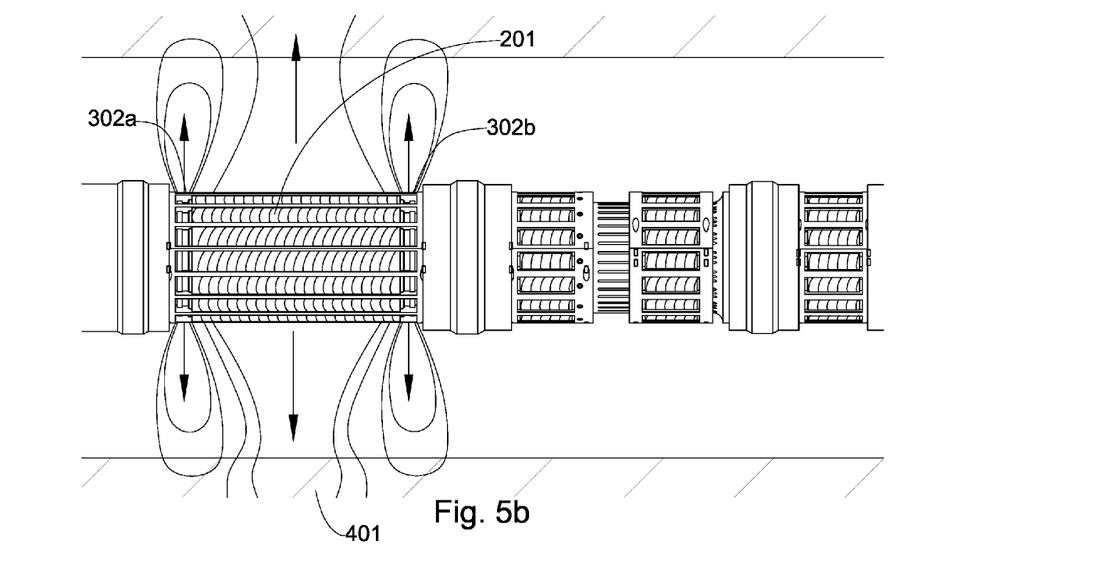
FIG. 5b is a perspective diagram of another embodiment of an induction resistivity assembly.

FIG. 5b discloses another embodiment of a tool string component with the transmitter 201 activated and both sides of bucking coils 302a, 302b activated with significantly more power, projecting the magnetic field 401 even further into the surrounding formation. The depth that the magnetic field may be projected into the formation may be adjusted by adjusting the field strength of the transmitter and one or more bucking coils.

Figure 6:
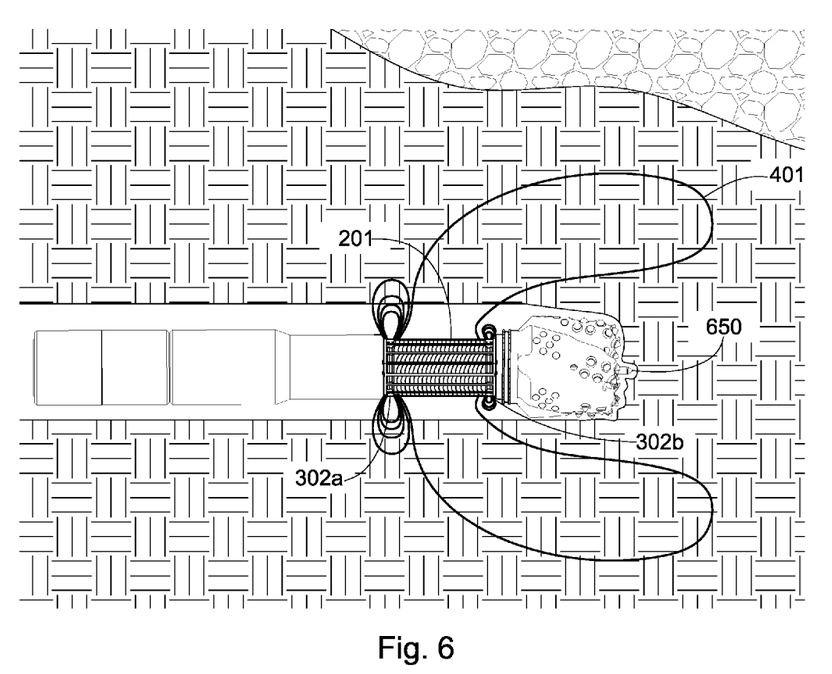
FIG. 6 is a perspective diagram of another embodiment of an induction resistivity assembly.

FIG. 6 discloses another embodiment of a tool string comprising a transmitter and two sets of bucking coils located close to the drill bit. By applying different strengths to the bucking coils as described above, the magnetic field 401 may be at any angle including in front of the drill bit. The receivers may be located immediately above the drill bit or on the drill bit itself. In some embodiments, a receiver may be attached to a protruding member 650 of the drill bit. Projecting the field ahead of the bit may allow for measurements ahead of the bit, thereby, aiding drillers with fore knowledge of uncut formation before the drill bit advances into it. The present embodiment allows drillers to know at least parameters of the formation that is in the process of being drilled.

Figure 7A:
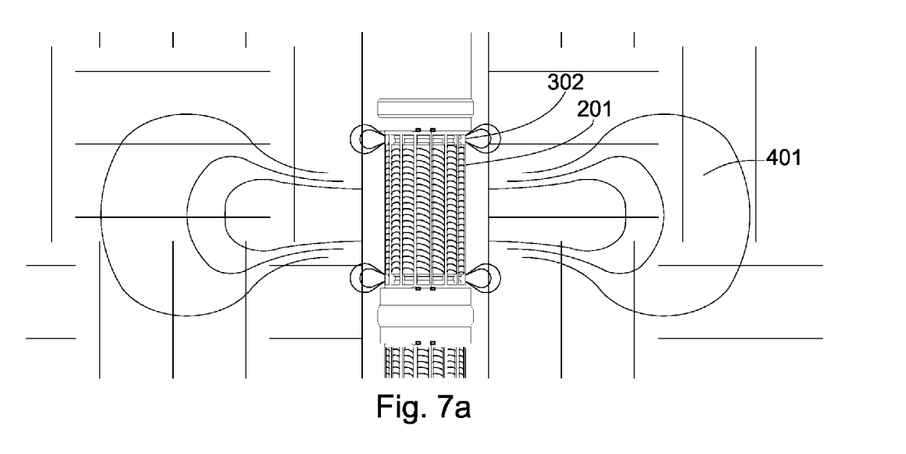
FIG. 7a is a perspective diagram of another embodiment of an induction resistivity assembly.
Figure 7B:
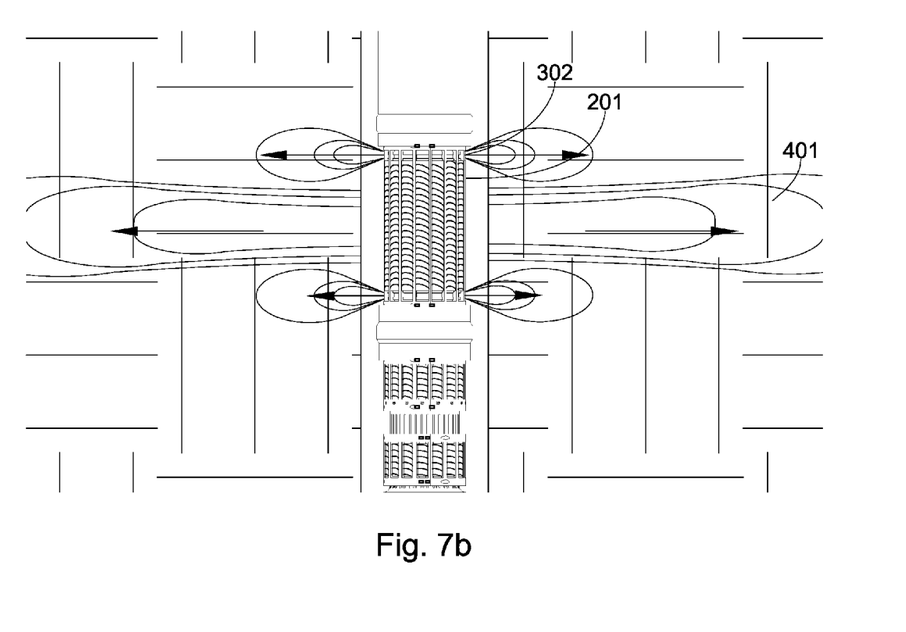
FIG. 7b is a perspective diagram of another embodiment of an induction resistivity assembly.

FIGS. 7a and 7b discloses an ability to sweep through a range of various formation depths by adjusting the current through the transmitter and bucking coils in any combination or pattern. This method may enable a driller to distinguish different formation parameters at different depths with more precision. By adjusting the depth, the distance of formation boundary changes from the tool string may be determined more readily.

Figure 8A:
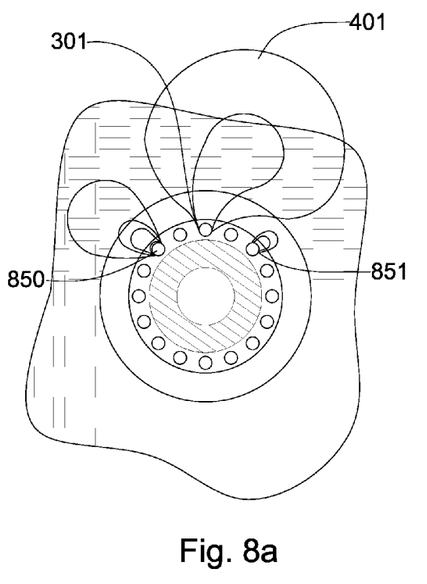
FIG. 8a is a cross-sectional diagram of another embodiment of an induction resistivity assembly.
Figure 8B:
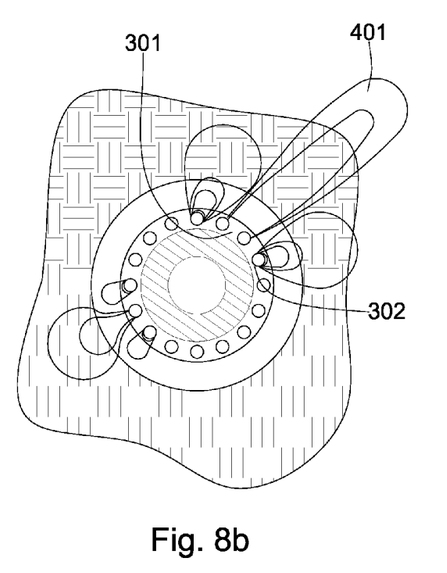
FIG. 8b is a cross-sectional diagram of another embodiment of an induction resistivity assembly.

FIGS. 8a and 8b disclose the transmitter unit 301 having one or more bucking coils located laterally on either side of one or more transmitter coils in addition to axially at the end of the transmitter coil. In FIG. 8a, bucking coil 850 receives significantly more power then the second bucking coil 851, causing the directed induction field 401 to angle into the formation. FIG. 8b discloses projecting different magnetic fields into the formation at different depths by controlling the field strength of the bucking coils.

Figure 9:
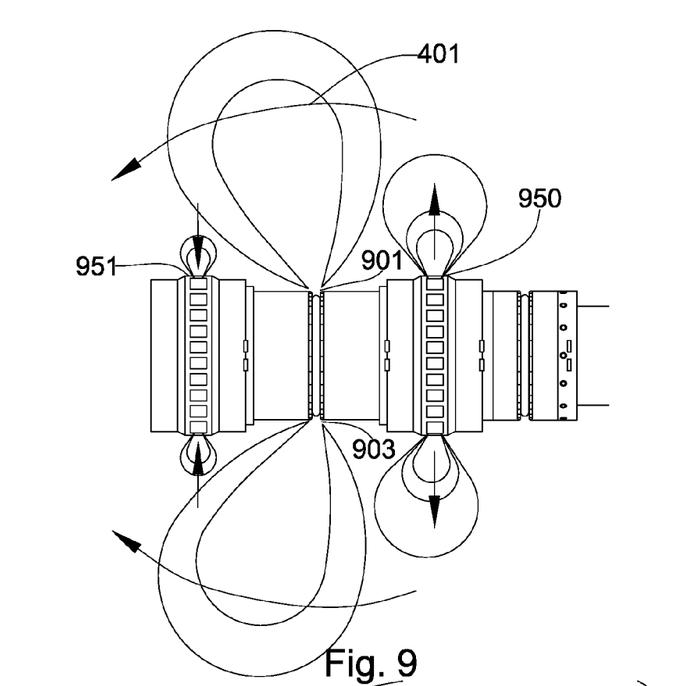
FIG. 9 is a perspective diagram of another embodiment of an induction resistivity assembly.

FIG. 9 discloses a transmitter comprising wire windings 901 wound circumferentially around the tool string component 100. The wire is disposed within a trough of magnetically conductive material 903. The magnetically conductive material may comprise mu-metals, ferrite, and/or iron. FIG. 9 also discloses that by changing the field strengths of the bucking coils with respect to each other, the angle of the magnetic field may change. In some embodiment, the strength of bucking coil 950 may increase while the strength of bucking coil 951 may decrease allowing the magnetic field to sweep through a range of angles. Such a sweep may help identify an angle of certain bed boundaries as well as discover other formation parameters.

Figure 10:
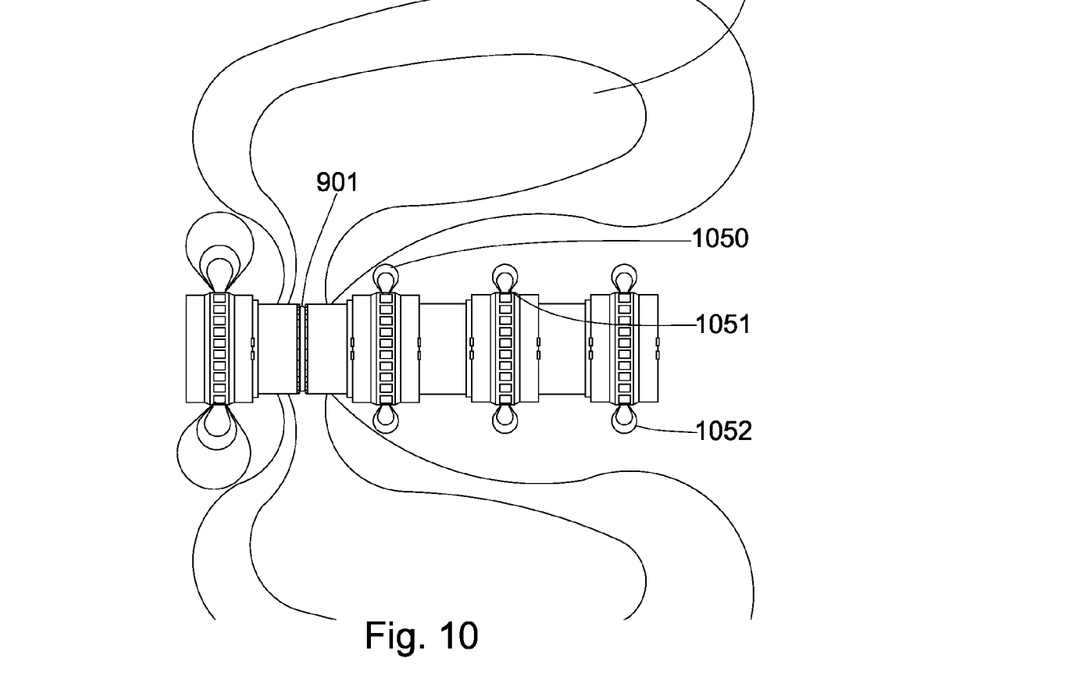
FIG. 10 is a perspective diagram of another embodiment of an induction resistivity assembly.

FIG. 10 discloses multiple bucking coils 1050, 1051, 1052 to prevent an angled magnetic field from returning to the tool string component. In some embodiments, the angle of the desired magnetic field may be so extreme that without additional bucking coils axially spaced along the tool string, the magnetic field may short to the metal of the tool string.

Figure 11A:
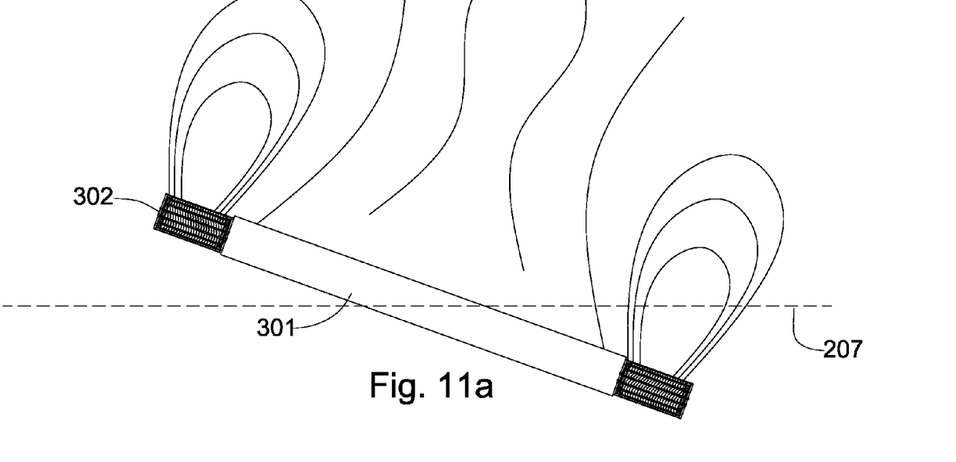
FIG. 11a is a perspective diagram of an embodiment of a transmitter unit surrounded by two bucking coils.
Figure 11B:
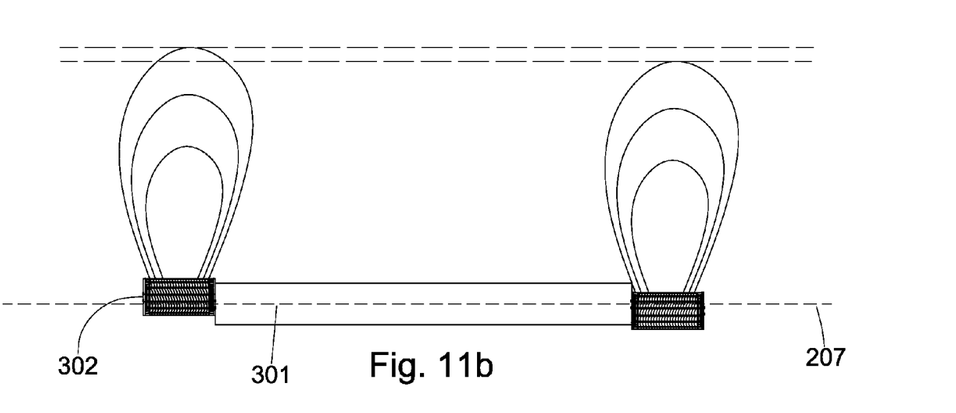
FIG. 11b is a perspective diagram of another embodiment of a transmitter unit surrounded by two bucking coils.
Figure 11C:
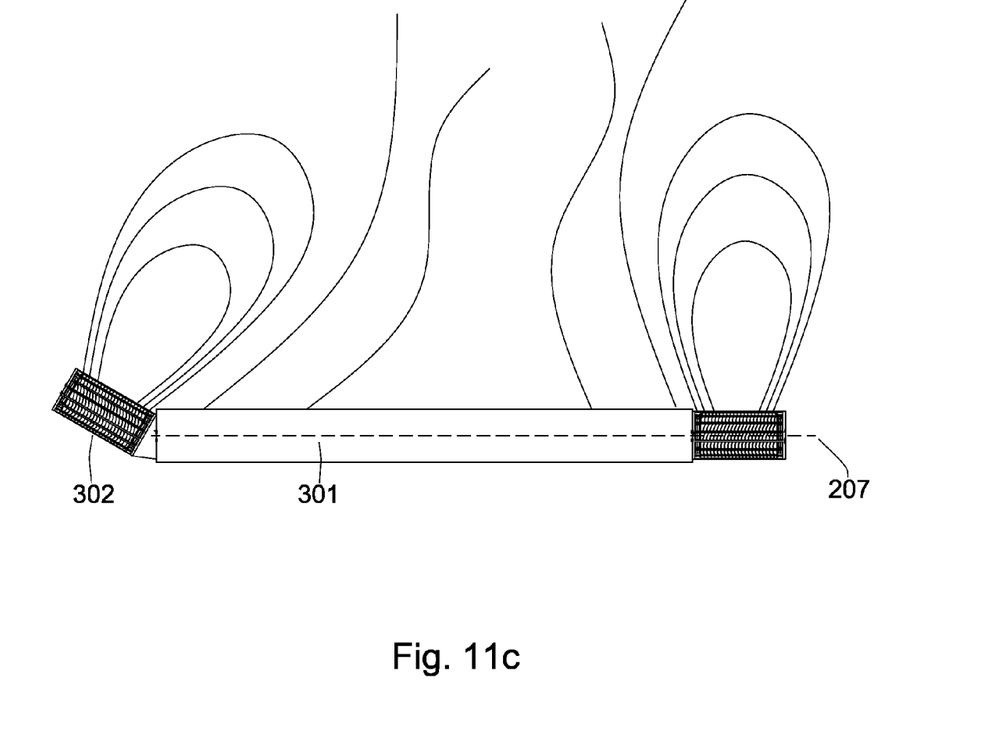
FIG. 11c is a perspective diagram of another embodiment of a transmitter unit surrounded by two bucking coils.

FIGS. 11a through 11c disclose embodiments of a transmitter unit including the transmitter coil 301 and bucking coils 302 adapted to project a magnetic field away from the tool at an angle. The relative positions of these transmitters and bucking coils may be permanently fixed during the downhole application or these positions may be adjustable, either manually or under tool control. FIG. 11a discloses tilting the entire transmitter unit. FIG. 11b discloses the bucking coils positioned at different heights with respect to each other, these heights may be adjustable, either manually or under tool control. FIG. 11c discloses one or more of the bucking coils angled with respect to one another, these angles may be adjustable, either manually or under tool control.

Figure 12A:
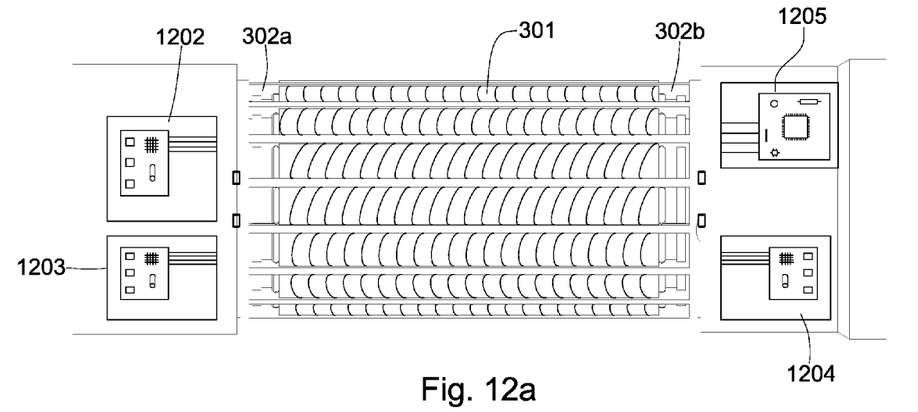
FIG. 12a is a perspective diagram of another embodiment of a transmitter with the electronic assemblies exposed.

FIG. 12a discloses electronic assemblies associated with the transmitter and/or bucking coils. Power may be supplied separately to the transmitter units 301 through a signal generator 1202, as well as to one or more bucking coils 302a, 302b or to the bucking coils from separate signal generators 1203, 1204. At least one bucking coil may also be connected to a Central Processing Unit, 1205, which may have inertial guidance and directional sensors.

Figure 12B:
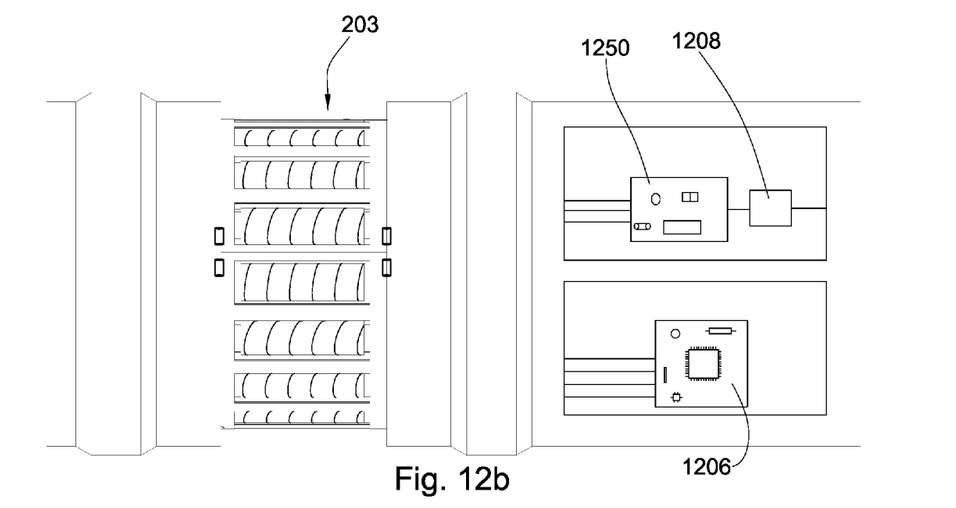
FIG. 12b is a perspective diagram of another embodiment of a receiver with the electronic assemblies exposed.

FIG. 12b discloses an embodiment of a receiver with electronic assemblies, 1206, which may include an adjustable gain amplifier, filters and an analog to digital converter. Also shown is an adjustable transmitter signal canceling circuit, 1250, attached to a the receiver. The transmitter signal canceling circuit, 1250, may be passive or active. The amount of canceling may be sampled from the same receiver, 203, or one or more other receivers. The amount of canceling may be sampled by a separate circuit, 1208, that is attached to a measuring circuit, 1202 (shown in FIG. 12*a*), which may be in communication with the tool processor. The sampling circuit, 1208, may communicate with signal generator 1202 (shown in FIG. 12*a*), or may communicate directly to one or more receiver, 203. In this manner, the receiver may cancel part or all of the transmitter magnetic field signal in the receiver. The remaining receiver signal is generated by the formation Foucault current created by the transmitter magnetic field at a phase angle primarily determined by Lenz's Law. This cancelling of the transmitter signal allows the receiver to process higher resolution measurements.

Figure 13:
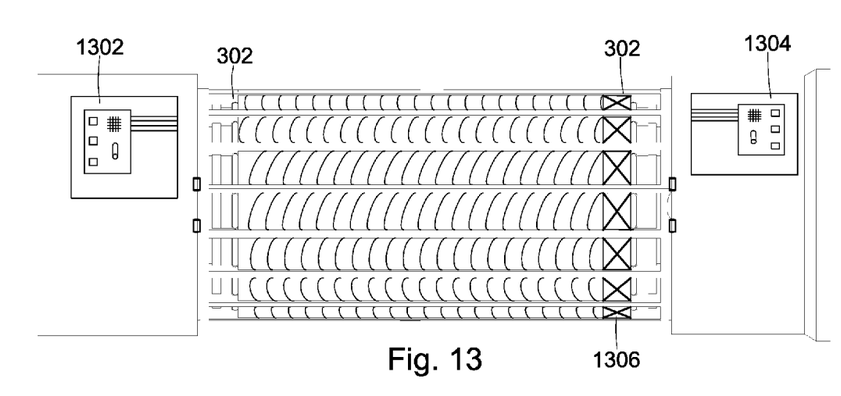
FIG. 13 is a perspective diagram of another embodiment of a transmitter with the electronic assemblies exposed.

FIG. 13 discloses an embodiment of the transmitter assembly which may use a signal generator, 1302, for an assembly of a transmitter coil and one or more bucking coils, 1306. The transmitter assembly, 302, which may include a circuit, 1304, may be connected to a movable platform 1306. The movable platform may cause the entire assembly or the distance between the transmitter and one or more bucking coils to vary, which may accordingly sweep the angle of the projected transmitter magnetic field.

Figure 14:
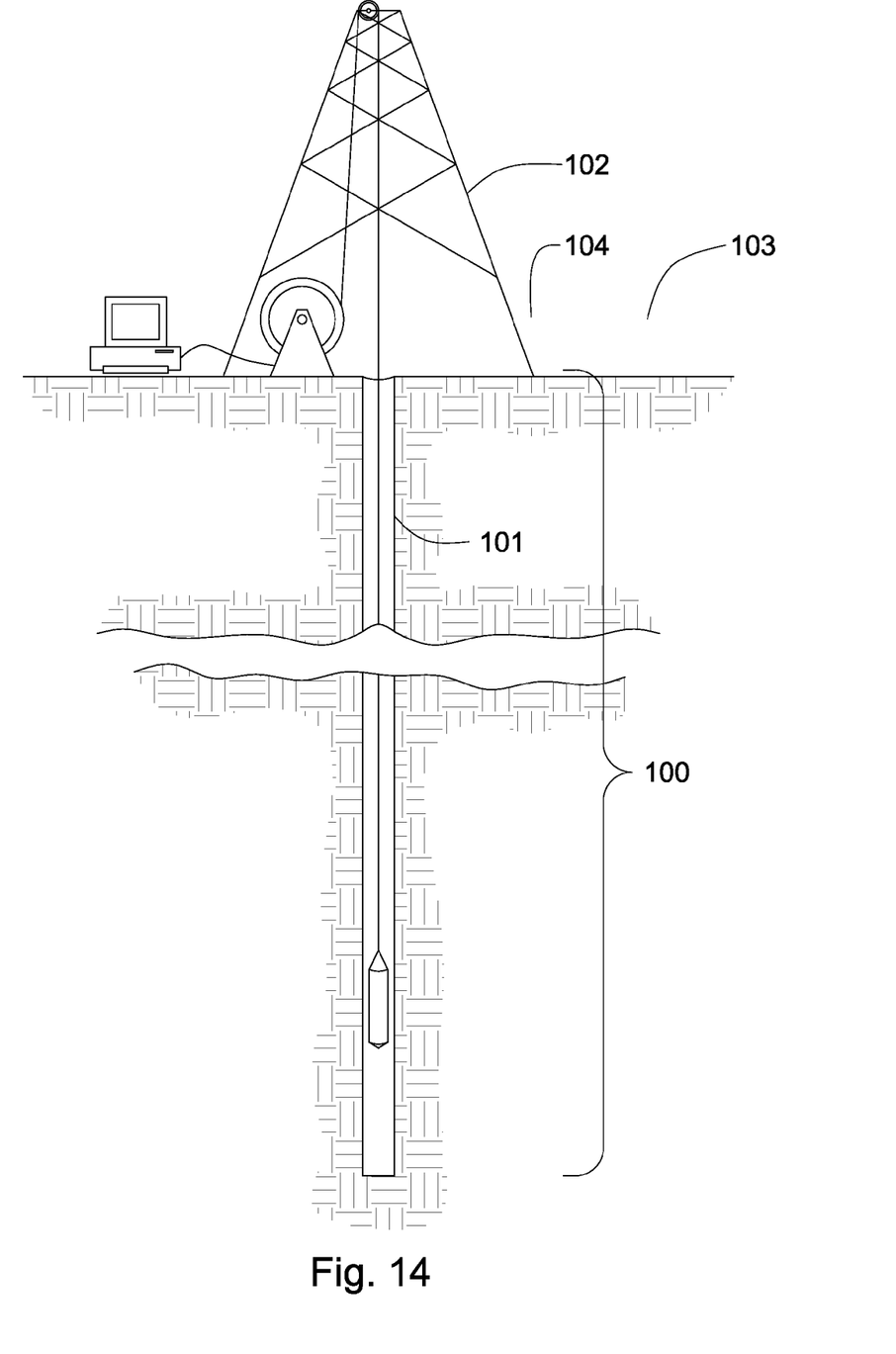
FIG. 14 is a perspective diagram of an embodiment of a wire-assembly suspended in a bore-hole.

FIG. 14 discloses another embodiment of a resistivity tool being lowered into a bore-hole using a wireline assembly.

Figure 15:
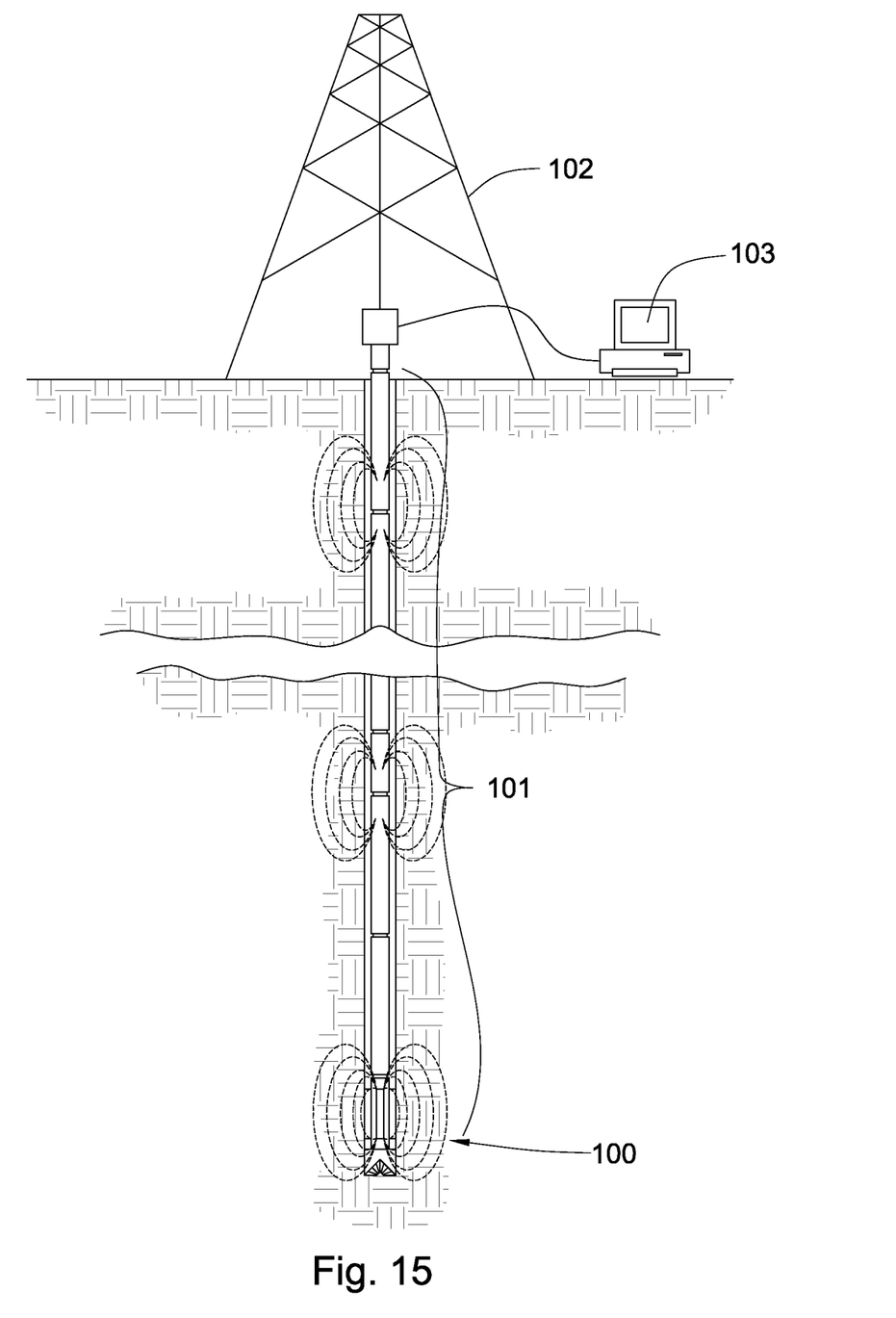
FIG. 15 is a perspective diagram of an embodiment of a downhole tool string suspended in a bore-hole.

FIG. 15 discloses an embodiment of several induction resistivity tools distributed along the length of the tool string.

Whereas the present invention has been described in particular relation to the drawings attached hereto, it should be understood that other and further modifications apart from those shown or suggested herein, may be made within the scope and spirit of the present invention.

What is claimed is:

1. A method for taking an induction resistivity measurement, comprising the steps of:

providing an induction transmitter and an induction receiver disposed along a length of a tool, the transmitter being disposed between at least one induction bucking coil of the tool;

projecting an induction field from the transmitter outward into a formation;

controlling the depth of the transmitted induction field by changing the strength or position of at least one of the bucking coils, wherein the step of controlling includes changing the field strength of both bucking coils at the same rate.

2. The method of claim 1, wherein the step of controlling includes changing the field strength of only one bucking coil.

3. The method of claim 1, wherein the step of controlling includes changing the field strength of the bucking coils inversely.

4. The method of claim 1, wherein the step of controlling includes changing a distance from the transmitter to at least one bucking coil.

5. The method of claim 1, wherein the step of providing includes that the bucking coils are spaced apart from the transmitter along the length of the tool.

6. The method of claim 1, wherein one or more bucking coils are electrically isolated from one another.

7. The method of claim 1, wherein the step of controlling includes changing a height of at least one of the bucking coils.

8. The method of claim 1, wherein the step of providing includes that the transmitter comprises a plurality of units spaced along the circumference of the tool that are individually energizible.

9. The method of claim 1, wherein the step of providing includes that the tool is part of a downhole tool string.

10. The method of claim 1, wherein the step of providing includes that the tool is part of a wireline assembly.

* * * * *